United States Patent
Ukai et al.

(10) Patent No.: US 10,322,951 B2
(45) Date of Patent: Jun. 18, 2019

(54) SYSTEM AND METHOD TO PREVENT CHEMICAL FOULING ON REVERSE OSMOSIS MEMBRANE

(71) Applicant: MITSUBISHI HEAVY INDUSTRIES, LTD., Tokyo (JP)

(72) Inventors: Nobuyuki Ukai, Tokyo (JP); Hideo Suzuki, Tokyo (JP); Hiroshi Nakashoji, Tokyo (JP); Shigeru Yoshioka, Tokyo (JP); Masayuki Eda, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 581 days.

(21) Appl. No.: 14/782,890

(22) PCT Filed: Jan. 28, 2015

(86) PCT No.: PCT/JP2015/052339
§ 371 (c)(1),
(2) Date: Oct. 7, 2015

(87) PCT Pub. No.: WO2015/115473
PCT Pub. Date: Aug. 6, 2015

(65) Prior Publication Data
US 2016/0046509 A1 Feb. 18, 2016

(30) Foreign Application Priority Data
Jan. 30, 2014 (JP) .................. 2014-015948

(51) Int. Cl.
*C02F 1/00* (2006.01)
*C02F 1/40* (2006.01)
(Continued)

(52) U.S. Cl.
CPC .............. *C02F 1/441* (2013.01); *B01D 61/12* (2013.01); *B01D 65/08* (2013.01); *C02F 3/1268* (2013.01);
(Continued)

(58) Field of Classification Search
CPC ............ B01D 2321/10; B01D 2321/16; B01D 2321/20; B01D 2321/40; B01D 61/12;
(Continued)

(56) References Cited

U.S. PATENT DOCUMENTS 4,086,164 A * 4/1978 Noda .................... B01D 17/00
588/320
5,460,723 A * 10/1995 Bourbigot ............ B01D 61/022
210/202

(Continued)

FOREIGN PATENT DOCUMENTS

JP 11-319852 A 11/1999
JP 2001-276834 A 10/2001

(Continued)

OTHER PUBLICATIONS

International Search Report dated Apr. 21, 2015, issued in counterpart application No. PCT/JP2015/052339 (2 pages).

(Continued)

*Primary Examiner* — David C Mellon
(74) *Attorney, Agent, or Firm* — Westerman, Hattori, Daniels & Adrian, LLP

(57) ABSTRACT

A reverse osmosis membrane apparatus 17 including an RO membrane 17a that yields recycled water 18 and concentrated water 19 from pre-treated raw water (inflow water 16), salts being removed in the recycled water and salts being concentrated in industrial park waste water 11; monitoring apparatuses 21A and 21B disposed at an inflow water line $L_1$ through which the inflow water 16 flows into the reverse (Continued)

osmosis membrane apparatus 17 or a concentrated water line $L_2$ through which the concentrated water 19 flows out from the reverse osmosis membrane apparatus 17, which monitor the presence of chemical fouling causal substances in the inflow water 16 or the concentrated water 19; and a chemical supply section 22, which is a removal apparatus that removes the chemical fouling causal substances from the inflow water 16 on the front upstream side of the inflow into the reverse osmosis membrane apparatus 17, upon the presence of chemical fouling causal substances in the inflow water 16 or the concentrated water 19 being confirmed. Thus, the chemical fouling preventing system removes chemical fouling causal substance from inflow water 16 before it enters the reverse osmosis membrane apparatus 17.

3 Claims, 15 Drawing Sheets

(51) Int. Cl.

| | |
|---|---|
| *C02F 1/44* | (2006.01) |
| *C02F 3/12* | (2006.01) |
| *C02F 5/00* | (2006.01) |
| *C02F 9/00* | (2006.01) |
| *B01D 61/12* | (2006.01) |
| *B01D 65/08* | (2006.01) |
| *C02F 103/08* | (2006.01) |

(52) U.S. Cl.
CPC .................. *C02F 5/00* (2013.01); *C02F 9/00* (2013.01); *B01D 2311/04* (2013.01); *B01D 2311/08* (2013.01); *B01D 2311/24* (2013.01); *C02F 1/008* (2013.01); *C02F 1/40* (2013.01); *C02F 2103/08* (2013.01); *C02F 2303/16* (2013.01); *C02F 2303/20* (2013.01); *Y02A 20/131* (2018.01); *Y02W 10/15* (2015.05)

(58) Field of Classification Search
CPC ............... B01D 65/08; B01D 2311/04; B01D 2311/08; B01D 2311/24; C02F 1/441; C02F 9/00; C02F 5/00; C02F 3/1268; C02F 2303/16; C02F 2103/08; C02F 1/008; C02F 1/40; C02F 2303/20; C02F 1/68; C02F 1/683; C02F 1/685; C02F 1/686; C02F 1/687; C02F 1/688; Y02A 20/131; Y02W 10/15
See application file for complete search history.

(56) References Cited

U.S. PATENT DOCUMENTS

| | | | | |
|---|---|---|---|---|
| 6,017,459 | A * | 1/2000 | Zeiher | B01D 61/12 |
| | | | | 210/321.6 |
| 8,840,786 | B2 * | 9/2014 | Wechsler | B03D 1/1431 |
| | | | | 210/221.1 |
| 2006/0096920 | A1 * | 5/2006 | Ayala | B01D 61/022 |
| | | | | 210/639 |
| 2007/0181496 | A1 * | 8/2007 | Zuback | B01D 61/025 |
| | | | | 210/636 |
| 2008/0173583 | A1 * | 7/2008 | Boodoo | C02F 1/42 |
| | | | | 210/652 |
| 2009/0045144 | A1 * | 2/2009 | Cohen | B01D 61/025 |
| | | | | 210/745 |
| 2010/0126935 | A1 * | 5/2010 | Echizen | B01D 61/025 |
| | | | | 210/652 |
| 2010/0319441 | A1 | 12/2010 | Nakano et al. | |
| 2013/0206689 | A1 | 8/2013 | Gibson et al. | |
| 2014/0311959 | A1 * | 10/2014 | Kamimura | C02F 9/00 |
| | | | | 210/202 |

FOREIGN PATENT DOCUMENTS

| | | |
|---|---|---|
| JP | 2003-275760 A | 9/2003 |
| JP | 2006-87988 A | 4/2006 |
| JP | 2007-252978 A | 10/2007 |
| JP | 2007-313445 A | 12/2007 |
| JP | 2008-132421 A | 6/2008 |
| JP | 2008-194560 A | 8/2008 |
| JP | 2008-253953 A | 10/2008 |
| JP | 2010-46621 A | 3/2010 |
| JP | 2010-47527 A | 3/2010 |
| JP | 2011-2397 A | 1/2011 |
| JP | 2011-235288 A | 11/2011 |
| JP | 2013-137279 A | 7/2013 |
| JP | 2013-158732 A | 8/2013 |

OTHER PUBLICATIONS

Translation of Written Opinion dated Apr. 21, 2015, issued in counterpart application No. PCT/JP2015/052339 (6 pages).
Sekiguchi, et al., "II-7. Hi-Ion Kaimen Kasseizai no Busekiho", Setonaikai-ku, Suisan Kenkyusho Chosa Kenkyu Sosho [online], Reserach Institute of Fisheries and Environment of Inland Sea, Fisheries Research Agency, 2000, retrieved Apr. 10, 2015, No. 1, pp. 77-84, cited in ISR.
Office Action dated Jul. 17, 2018, issued in counterpart Japanese Application No. 2014-015948, with English machine translation. (7 pages).

* cited by examiner

SYSTEM AND METHOD TO PREVENT CHEMICAL FOULING ON REVERSE OSMOSIS MEMBRANE

TECHNICAL FIELD

The present invention relates to a system and method to prevent chemical fouling on a reverse osmosis membrane.

BACKGROUND ART

Conventionally, industrial waste water containing organic matter from various industries is treated by biological treatment processes such as standard activated sludge method. The standard activated sludge method is a biological treatment method of performing biological treatment of organic waste water aerobically. Waste water from various factories is treated by the first-stage treatments, such as oil-water separation treatment and coagulation-sedimentation treatment, for example, followed by the second-stage treatments such as activated sludge treatment. Then, recycled water is obtained as permeate water from a water regeneration apparatus such as a reverse osmosis membrane apparatus, for example.

Examples of the reverse osmosis membranes used in the reverse osmosis membrane apparatus include polyamide-based materials. However, there are problems that polyamide-based materials are prone to contamination by organic matters, resulting in the decrease of permeation flow rate.

A method and an apparatus for treating water by an adsorbing means using an adsorbent that can prevent contamination of a reverse osmosis membrane and suppress reduction of permeation flow rate have been proposed to-date (Patent Document 1).

CITATION LIST

Patent Literature

Patent Document 1: Japanese Unexamined Patent Application Publication No. 2003-275760A

SUMMARY OF INVENTION

Technical Problem

However, in the proposal of the conventional art, there is a problem that a contaminant will leak through the adsorbing means and contaminate the reverse osmosis membrane, in the case of the absorbent breaking through against the contaminant.

In the conventional art described in the Patent Document 1, though it is possible to analyze the contaminants adsorbed to the adsorption column, there is a problem that it is not possible to predict contaminant leak into processed water, unless the contaminant is known (identified) and capacity of the adsorbent for the contaminant is also known.

Therefore, the conventional art is not sufficient as a countermeasure against reverse osmosis membrane contamination for industrial waste water which may contain unknown contaminants or sea water which may be mixed into waste water from nearby ocean or waters.

Thus, the introduction of the system for preventing chemical fouling on reverse osmosis membranes is strongly desired, the system being able to prevent chemical fouling that clogs reverse osmosis membranes by identifying the contaminants prior to the introduction of raw water to a reverse osmosis membrane apparatus, when the treatment and recycling of the raw water such as industrial waste water, sea water and the like is performed.

In light of the problem described above, the present invention addresses the problem of providing a system and a method to prevent chemical fouling on a reverse osmosis membrane, which is capable of identifying contaminants and implementing a countermeasure prior to the introduction of a reverse osmosis membrane apparatus.

Solution to Problem

The first invention of the present invention to solve the problems described above is a system to prevent chemical fouling on a reverse osmosis membrane, comprising a pre-treatment means that pre-treats raw water, a reverse osmosis membrane apparatus including a reverse osmosis membrane that yields recycled water having its salts removed and concentrated water having salts in raw water concentrated, from pretreated inflow water, a monitoring apparatus disposed at an inflow water line through which inflow water flows in and/or a concentrated water line through which concentrated water flows out, that monitors the presence of chemical fouling causal substances in the inflow water or the concentrated water, and a removal apparatus that removes the chemical fouling causal substances from the inflow water on the front stream side of the inflow into the reverse osmosis membrane apparatus, upon the presence of chemical fouling causal substances in the inflow water or the concentrated water being confirmed as a result of the monitoring by the monitoring apparatus.

The second invention relates to the system that prevents chemical fouling on a reverse osmosis membrane according to the first invention, wherein the monitoring apparatus performs chemical monitoring to determine the chemical fouling causal substance.

The third invention relates to the system that prevents chemical fouling on a reverse osmosis membrane according to the first invention, wherein the monitoring apparatus branches off a part of the inflow water and confirms degradation of membrane due to the presence of chemical fouling by a small membrane apparatus for chemical fouling monitoring.

The fourth invention relates to a method to prevent chemical fouling on a reverse osmosis membrane, comprising a pre-treatment process that pre-treats raw water, a reverse osmosis membrane process that separates permeate water and concentrated water from pre-treated inflow water by a reverse osmosis membrane, salts being removed in the recycled water and salts in raw water being concentrated, a monitoring process that monitors the presence of chemical fouling causal substances in the inflow water of the reverse osmosis membrane process or the concentrated water of the reverse osmosis membrane process, and a removing process that removes the chemical fouling causal substances from the inflow water on the front stream side of the inflow into the reverse osmosis membrane apparatus, upon the presence of chemical fouling causal substances in the inflow water or the concentrated water being confirmed as a result of the monitoring in the monitoring process.

Advantageous Effects of Invention

According to the present invention, when recycled water is produced by the reverse osmosis membrane apparatus, it is possible to prevent inflow of a contaminant into the reverse osmosis membrane apparatus and protect the reverse osmosis membrane apparatus by monitoring chemical fouling causal substance by a monitoring apparatus and by performing the operation to reduce the cause of the chemical fouling in a control apparatus.

BRIEF DESCRIPTION OF DRAWING

FIG. 5-1 illustrates a schematic view of a small membrane apparatus for chemical fouling monitoring.

FIG. 5-2 illustrates a schematic view of a small membrane apparatus for chemical fouling monitoring.

DESCRIPTION OF EMBODIMENTS

The following is a detailed description of a preferred embodiment of the present invention with reference to the attached drawings. Note that the invention is not limited by the embodiment, and when a plurality of embodiments are present, the invention is intended to include a configuration combining these embodiments.

Embodiment 1

Figure 1:
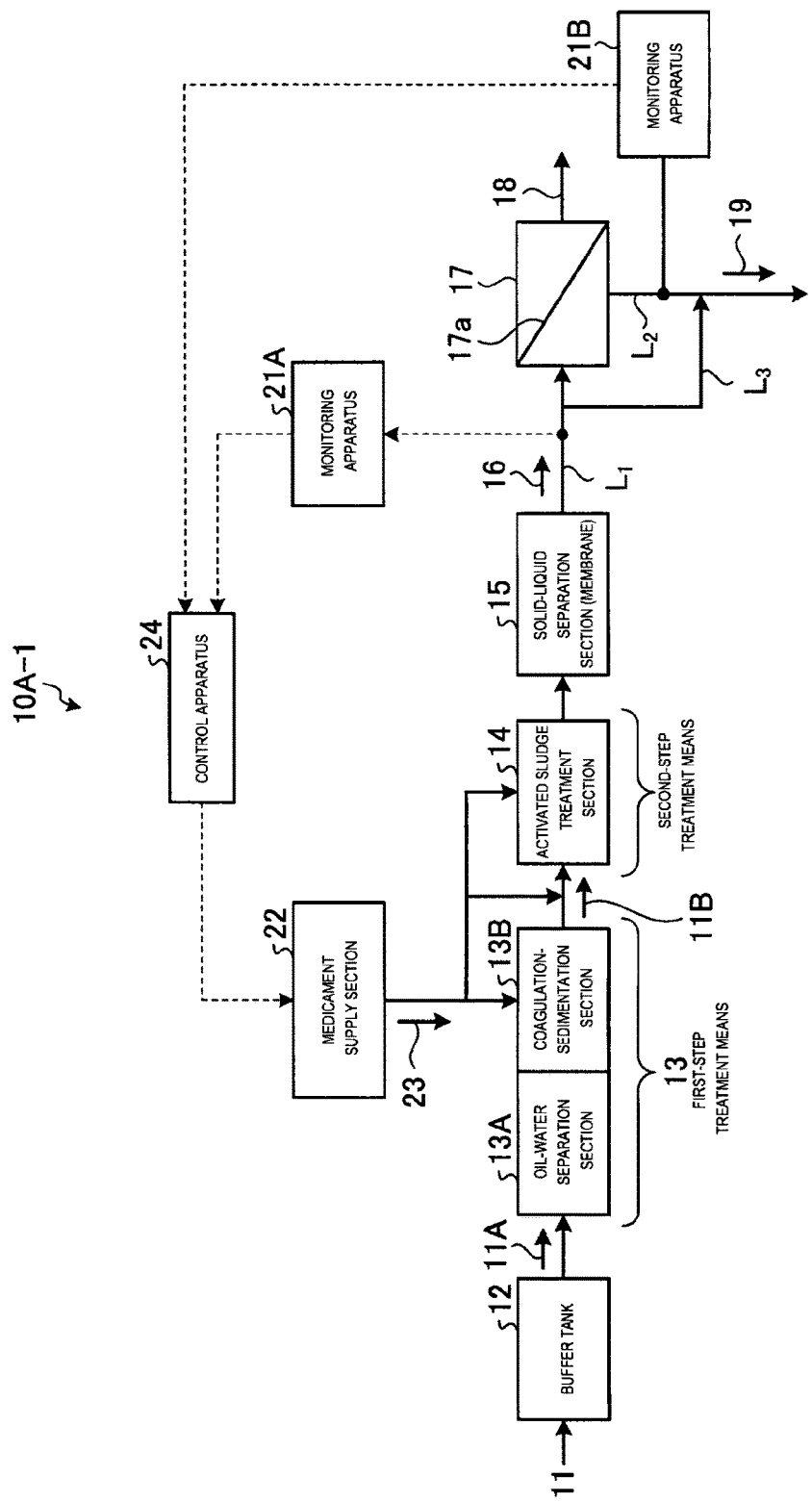
FIG. 1 illustrates a schematic view of the chemical fouling prevention system according to embodiment 1.
Figure 2:
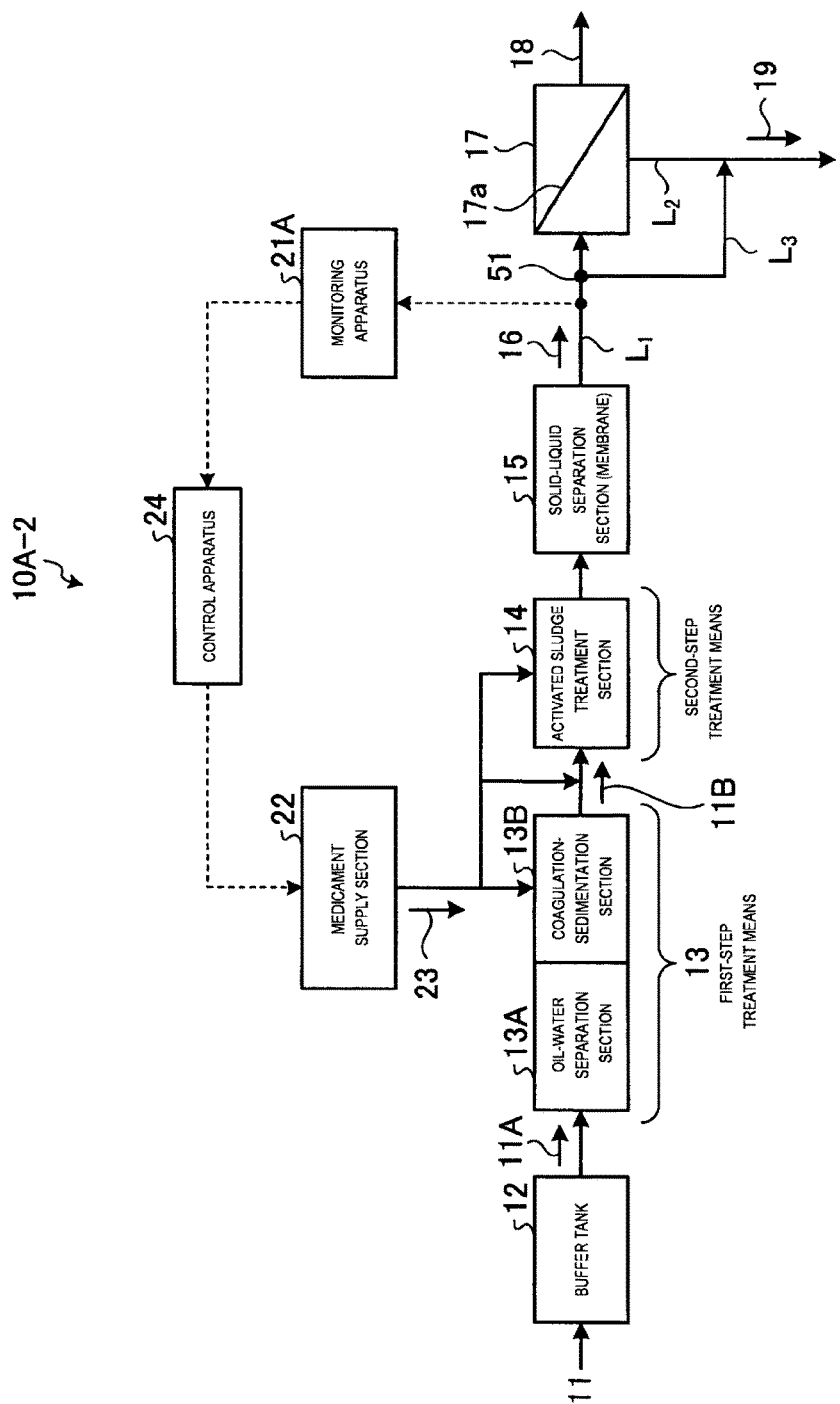
FIG. 2 illustrates a schematic view of another chemical fouling prevention system according to embodiment 1.
Figure 3:
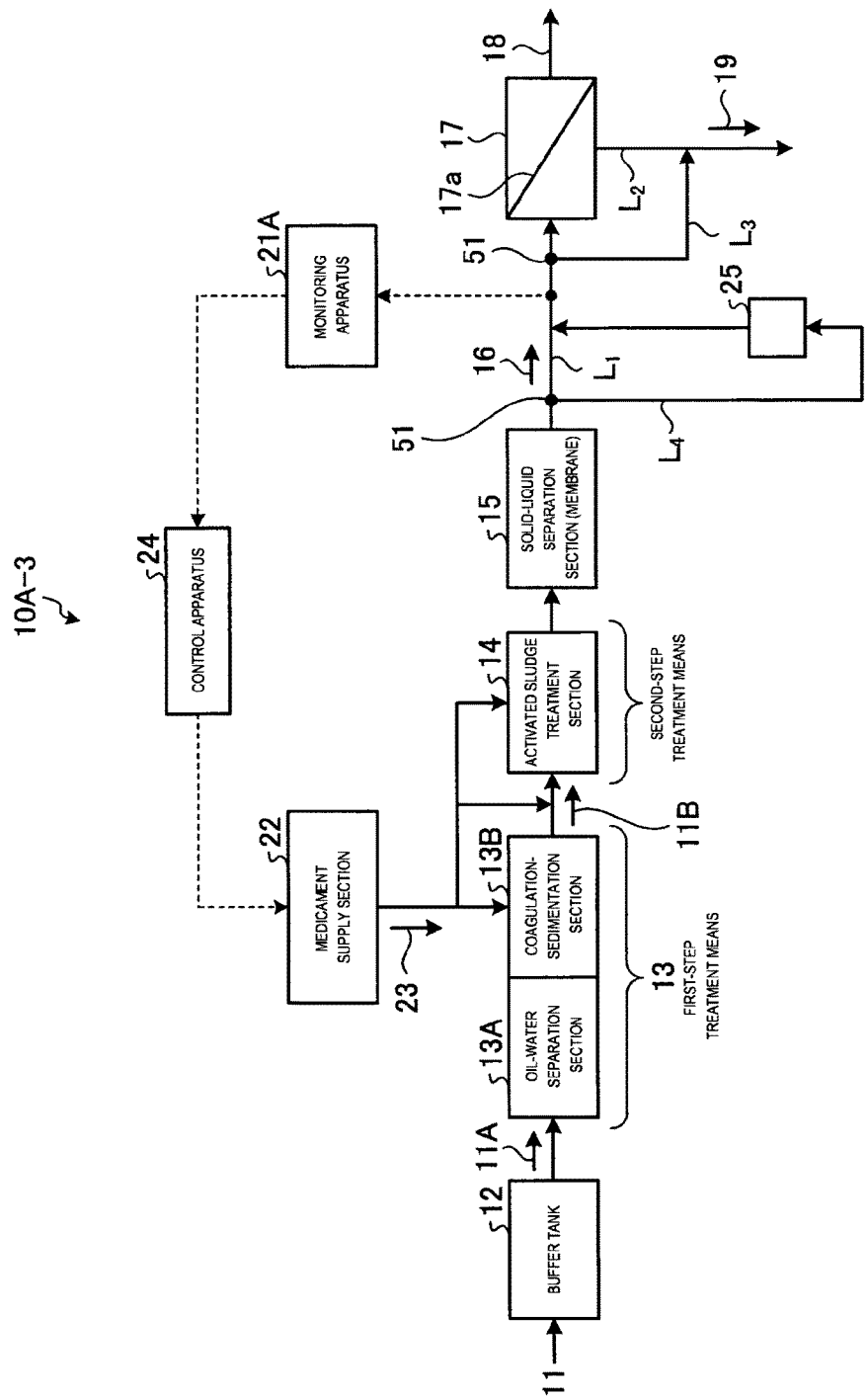
FIG. 3 illustrates a schematic view of another chemical fouling prevention system according to embodiment 1.

FIG. 1 illustrates a schematic view of the chemical fouling prevention system according to embodiment 1. FIG. 2 and FIG. 3 illustrate schematic views of other chemical fouling prevention systems according to embodiment 1.

As illustrated in FIG. 1, a chemical fouling preventing system 10A-1 according to the present embodiment comprises the following: a buffer tank 12 which temporally accepts and stores industrial park waste water 11; a first-step treatment means 13 which treats outflow water 11A from the buffer tank 12 as a first step; an activated sludge treatment section 14 in which outflow water 11B that is already treated by the first-step treatment means 13 is treated by microorganisms as a second-step treatment means; a reverse osmosis membrane apparatus 17 including an RO membrane 17a, which yields recycled water (permeate water) 18 with its salts removed, and concentrated water 19 with salts in industrial park waste water 11 concentrated, from pre-treated inflow water 16; monitoring apparatuses 21A and 21B, which are disposed at an inflow water line $L_1$ through which the inflow water 16 flows into the reverse osmosis membrane apparatus 17 and/or a concentrated water line $L_2$ through which the concentrated water 19 flows out from the reverse osmosis membrane apparatus 17 and monitor the presence of chemical fouling causal substance in the inflow water 16 or the concentrated water 19; and a chemical supply section 22, which is a removal apparatus that removes the chemical fouling causal substances from the inflow water 16 by supplying a chemical 23 on the front stream side of the inflow into the reverse osmosis membrane apparatus 17, upon the presence of chemical fouling causal substances in the inflow water 16 or the concentrated water 19 being confirmed as a result of the monitoring by the monitoring apparatuses 21A and 21B. Thus, the chemical fouling preventing system 10A-1 performs countermeasures to remove chemical fouling causal substance from inflow water 16 before it enters the reverse osmosis membrane apparatus 17.

In addition, symbol 15 denotes a solid-liquid separation section (membrane), and symbol 24 denotes a control means.

The present embodiment describes below an exemplary use of anionic chemical as a chemical 23 to counteract cationic surfactant specified as a chemical fouling causal substance. However, the present invention is not limited to this description since chemical fouling due to an unknown chemical can occur.

The chemical fouling preventing system 10A-1 illustrated in FIG. 1 comprises a monitoring apparatus 21B disposed at a concentrated water line $L_2$ of the reverse osmosis membrane apparatus 17, as well as a monitoring apparatus 21A disposed at an inflow water line $L_1$ of the reverse osmosis membrane apparatus 17.

That is, since a chemical fouling causal substance is monitored at any one of the monitoring apparatus 21A or 21B, and chemical 23 is prepared as a countermeasure, it is possible to inject the chemical promptly.

The first-step treatment means 13 comprises, for example, an oil-water separation section 13A, coagulation-sedimentation section 13B, optionally a storage tank (not illustrated) and the like, and performs first-step treatment of industrial park waste water 11. Additionally, a pre-sedimentation apparatus and the like may be added. Furthermore, a buffer tank may be included in the first-step treatment means 13.

A second-step treatment means is an activated sludge treatment section 14 or a variation thereof. Specifically, examples include a standard activated sludge method, a membrane separation activated sludge method (methods that employ membrane bioreactor: MBR, microfiltration membrane (MF membrane), or ultrafiltration membrane (UF membrane)), bio-film method (bio-film reactor: BFR), and methods that employ bio-carriers.

Next, the steps to perform the treatment using the chemical fouling preventing system is described for the case of monitoring with the monitoring apparatus 21A disposed at the inflow water line $L_1$ of the reverse osmosis membrane apparatus 17.

The chemical fouling preventing system 10A-2 illustrated in FIG. 2 is a schematic view of a chemical fouling preventing system that has a monitoring apparatus 21A disposed only at the inflow water line $L_1$ of the reverse osmosis membrane apparatus 17.

First, industrial park waste water 11, which is raw water, is passed through and pre-treated by the first-step treatment means 13, the activated sludge treatment section 14 and the solid-liquid separation section (membrane) 15, and the presence of chemical fouling causal substance in inflow water 16 in the inflow water line $L_1$ is monitored by the monitoring apparatus 21A.

The result of the monitoring at this monitoring apparatus 21A continuously determines whether the characteristics of inflow water 16 is normal or not.

For this determination, a detection apparatus in the monitoring apparatus 21A measures the concentration of cationic surfactant in inflow water 16.

By measuring the concentration of cationic surfactant in inflow water 16 directly, it is possible to determine its presence.

Exemplary methods used in the detection apparatus for measuring the concentration of cationic surfactant include methylene blue method, bromophenol blue method, sodium method, potassium ferricyanide method and phosphotungstic acid method. And as a separation and measuring method for individual substances, gas chromatography (GC) method, liquid chromatography method (LC) and the like can be employed. Therefore, methods are not specifically limited for the detection apparatus.

1. If the absence of the cationic surfactant is confirmed as a result of the measurement of the cationic surfactant, then the normal production operation of recycled water 18 is continued.

2. As opposed to 1, if the presence of the cationic surfactant is confirmed as a result of the measurement of the cationic surfactant, then the operation to inject anionic chemical 23 into the coagulation-sedimentation section 13B, the activated sludge treatment section 14 or the position between the two, from the anionic chemical supply section 22 by the control of the control apparatus 24 is performed.

The behavior of this injection operation is explained with reference to FIG. 4.

Figure 4:
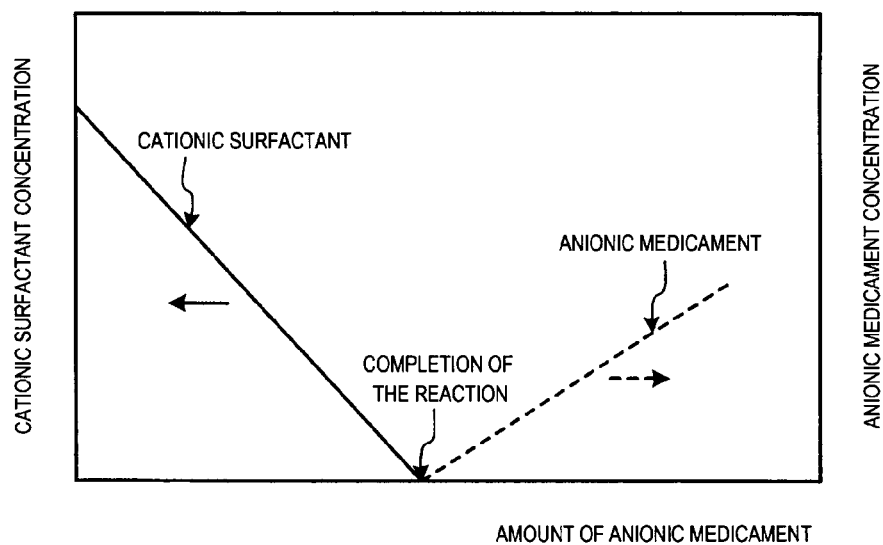
FIG. 4 illustrates a behavior of reaction between a cationic surfactant and an anionic chemical.

FIG. 4 illustrates a behavior of reaction between a cationic surfactant (solid line in the figure) and an anionic chemical.

As illustrated in FIG. 4, when cationic surfactant is present, the concentration of the cationic surfactant is reduced by injecting the anionic chemical 23 as an anionic chemical from the chemical supply section 22 and promote the reaction.

By injecting the prescribed amount, the concentration of the cationic surfactant is reduced and brought to zero, at which the reaction is finished.

When the injection of the anionic chemical is continued after that point, the concentration of the anionic chemical increases (indicated by the dashed line in the figure).

Meanwhile, if the anionic chemical is present in excess, it would not be an issue since the anionic chemical is generally supplied at reverse osmosis membrane apparatus 17 that produces recycled water 18.

Exemplary anionic chemicals of the present invention are, but not limited to, the following:

(a) Exemplary antiscalants as anionic chemicals include Flocon 260 commercially available from BWA Water Additives Ltd., Kuriroyal S commercially available from Kurita Water Industries Ltd., and PermaTreat PC-191T, OSMOTREAT OSM786T commercially available from Nalco.

(b) Exemplary flocculants as anionic chemicals include sodium alginate, sodium carboxymethylcellulose (CMC), sodium polyacrylate, partially hydrolyzed salts of polyacrylamide, and maleic acid copolymerization products.

(c) Exemplary surfactants as anionic chemicals include chemicals having anionic groups, which include carboxylic acid type surfactants (R—COO-M$^+$), sulfonic acids type surfactants (R—SO$_3$-M$^+$), phosphate ester type surfactants (R—O—PO(OH)O-M$^+$), and sulfate ester type surfactants (R—O—SO$_3$-M$^+$ structure). R denotes alkyl group, and M$^+$ is cation (sodium ion (Na$^+$) and the like).

Carboxylic acid type surfactants include sodium octanoate, sodium decanoate, sodium laurate, sodium myristate, sodium palmate, sodium stearate, perfluoroalkyl carboxylic acid (PFOA), perfluorononanoic acid, N-sodium lauroylsarcosine, sodium cocoil glutamate and alpha sulfonated fatty acid methyl ester salts.

In addition, sulfonic acid type surfactants include sodium 1-hexanesulfonate, sodium 1-octanesulfonate, sodium 1-decanesulfonate, sodium 1-dodecanesulfonate, perfluorobutane sulfonic acid, sodium linear alkyl benzenesulfonate, sodium toluenesulfonate, sodium cumenesulfonate, sodium octylbenzenesulfonate, sodium dodecylbenzenesulfonate (DBS), sodium naphthalenesulfonate, di-sodium naphthalenedisulfonate, tri-sodium naphthalenetrisulfonate, sodium butylnaphthalenesulfonate, and perfluorooctanesulfonic acid (PFOS).

Sulfate ester type surfactants include sodium lauryl sulfate, sodium myristyl sulfate, sodium laureth sulfate, sodium polyoxyethylenealkylphenolsulfonate, and ammonium lauryl sulfate.

Phosphate ester type surfactants include lauryl phosphate, sodium lauryl phosphate and potassium lauryl phosphate.

Additionally, since suspension may be formed via solidification or gelation when a cationic chemical reacts with anionic chemical, a coagulation-separation apparatus, an activated sludge tank (including MBR), sand filtering and the like are implemented as apparatuses to separate and dispose the suspension after the reaction.

Furthermore, by attaching a fluorescent marker to the anionic chemical 23 and monitoring the intensity of the fluorescence, it maybe confirmed that the reaction between the two is taking place if the fluorescence is absent and also it maybe confirmed that the reaction is finished if the fluorescence is observed.

Exemplary chemicals with the fluorescent marker include PermaTreat PC-191T, OSMOTREAT OSM786T, both commercially available from Nalco, and the like.

That is, the reaction between the cationic surfactant and the anionic chemical with the fluorescent marker separates both as solids. Therefore, when the chemical 23 is injected to the coagulation-sedimentation section 13B, for example, if the outflow water 11B from the coagulation-sedimentation section 13B contains anionic chemical, the presence of the anionic chemical can be confirmed by the fluorescence.

Also, if the outflow water 11B contains the anionic chemical, it is confirmed that the cationic surfactant has been already removed via the reaction with the anionic chemical.

Furthermore, when the cationic surfactant is used at the source of industrial park waste water 11, a cationic surfactant with a fluorescent marker may be used.

In this case, the presence of the cationic chemical in the inflow water 16 can be confirmed by fluorescence.

If the absence of the cationic surfactant is confirmed as a result of the monitoring of the cationic surfactant, then the normal operation is continued.

Meanwhile, when the presence of the cationic surfactant is confirmed, it is determined that the injection of the anionic chemical is not sufficient, and bypass operation is performed to bypass the inflow water 16 into the concentrated water line $L_2$ via the bypass line $L_3$. After the bypass operation, the raw water is disposed. Switching to the bypass line $L_3$ is performed by a switching valve 51, which can be a three-way-valve, for example.

Alternatively, all of the inflow water 16 is introduced to an adsorption tower 25 that is disposed in the branched line $L_4$ branched from the inflow water line $L_1$, and adsorption treatment is performed.

The adsorption tower 25 is filled with adsorbents comprising the material of the RO membrane 17a. The adsorption treatment is performed in the adsorption tower 25, then the removal of the cationic surfactant and unknown substance is confirmed by the monitoring apparatus 21A, followed by directing the treated water into the reverse osmosis membrane apparatus 17.

In the present embodiment, the cationic surfactant is used as an example of a chemical fouling causal substance in the description. Other chemical fouling causal substances include cationic surfactants, cation-type flocculant, multivalent ions and the like, for example.

A cationic surfactant is a surfactant with cationic hydrophilic group. Exemplary hydrophilic groups include quaternary ammonium salt type, amine salt type and the like.

Specifically, they include distearyldimethylammonium chloride and benzalkonium chloride.

Exemplary quaternary ammonium salt-type surfactants include tetramethylammonium chloride, tetramethylammonium hydroxide, tetrabutylammonium chloride, dodecyldimethylbenzylammonium chloride, alkyltrimethylammonium chloride, octyltrimethylammonium chloride, decyltrimethylammonium chloride, dodecyltrimethylammonium chloride, tetradecyltrimethylammonium chloride, cetyltrimethylammonium chloride (CTAC), stearyltrimethylammonium chloride, alkyltrimethylammonium bromide, hexadecyltrimethylammonium bromide (CTAB), benzyltrimethylammonium chloride, benzyltriethylammonium chloride, benzalkonium chloride, benzalkonium bromide, benzethonium chloride, dialkyldimethylammonium chloride, didecyldimethylammonium chloride, distearyldimethylammonium chloride and the like.

Exemplary alkylamine-type surfactants include monomethylamine hydrochloride, dimethylamine hydrochloride, trimethylamine hydrochloride and the like.

Exemplary surfactants having a pyridine ring include butylpyridinium chloride, dodecylpyridinium chloride, cetylpyridinium chloride and the like.

Also, exemplary flocculants include water soluble aniline resin, polythiourea, polyethylenimine, quaternary ammonium salt, polyvinylpyridine and the like.

Furthermore, multi-valent cations include aluminum ion ($Al^{3+}$), ferrous and ferric ion ($Fe^{2+}$, $Fe^{3+}$) and the like.

Apart from the chemical measurement of chemical fouling, a physical measurement apparatus that monitors physical behavior of the membrane of raw water as the monitoring apparatus 21A is described in the following.

The physical measurement apparatus is a small membrane apparatus for chemical fouling monitoring, which is a miniaturized reverse osmosis membrane apparatus 17. It monitors flow rate change, pressure change and salt concentration change of the inflow water 16 or the concentrated water 19 as a function of time, using a planer membrane-type RO membrane, or membrane element, module and the like for example, and determines the occurrence of chemical fouling upon the changes being more than expected (for example, not less than 1.1 times as large as normal or preferably not less than 2 times as large as normal).

Thus, it is possible to monitor foreign substances other than cationic polymer.

Figures 1, 5:
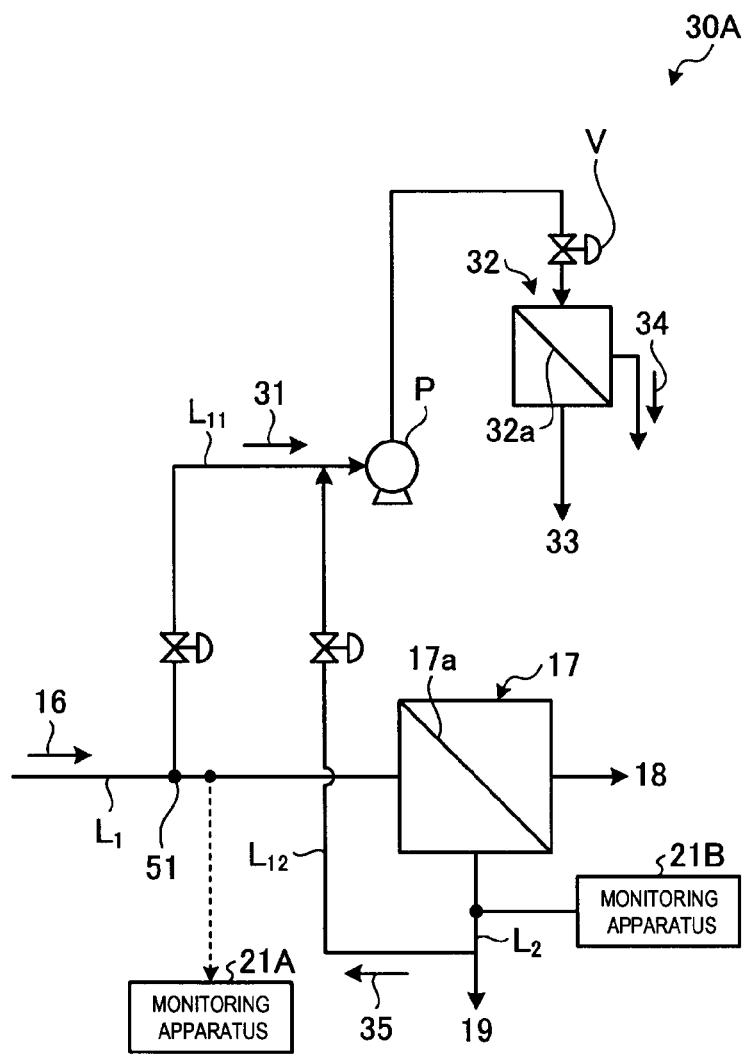
Figures 2, 5:
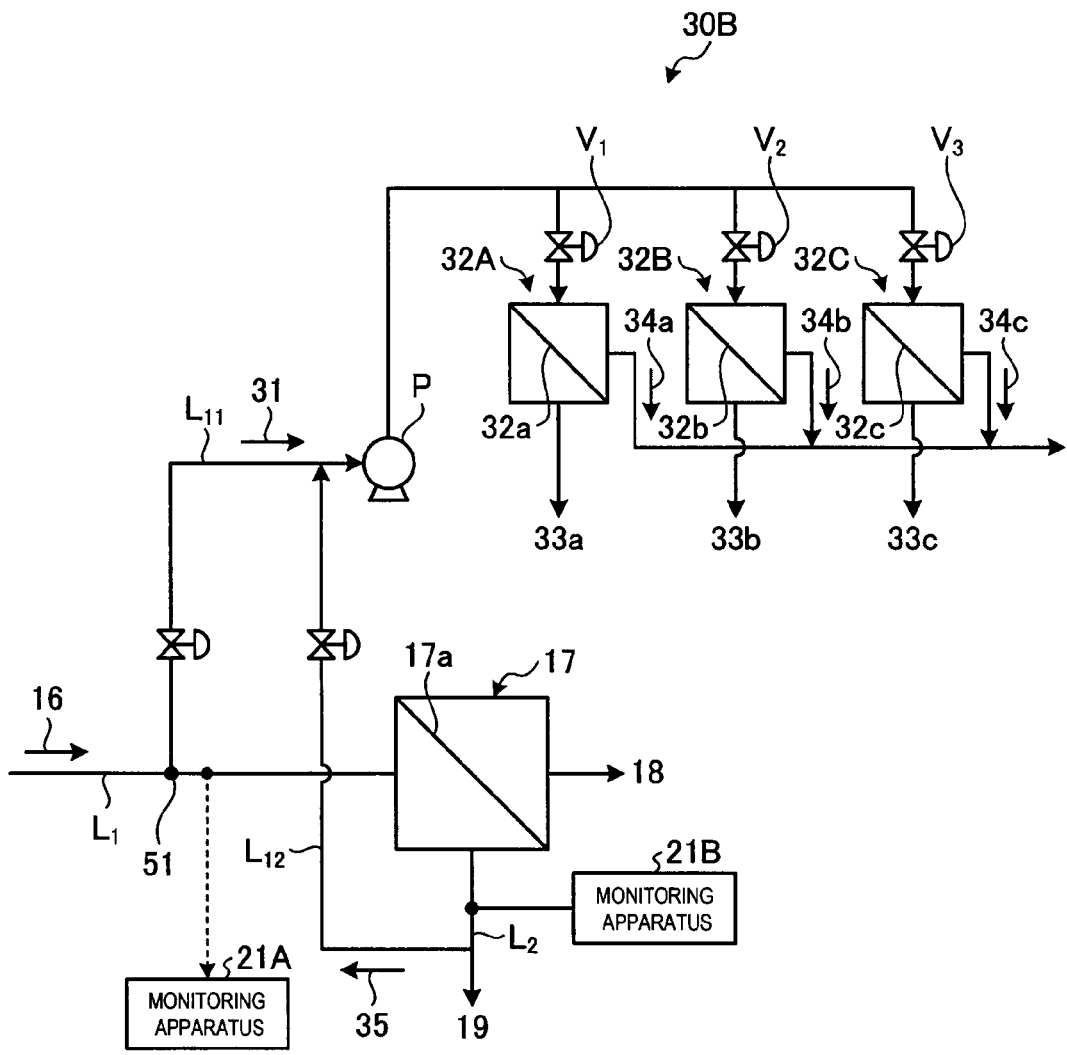

FIG. 5-1 and FIG. 5-2 illustrate schematic views of the small membrane apparatus for chemical fouling monitoring.

As illustrated in FIG. 5-1, the small membrane apparatus for chemical fouling monitoring 30A comprises a branched line $L_{11}$ that branches off from the inflow water line $L_1$, branching off the inflow water 16 into branched water flow 31, a high-pressure pump P disposed in the branched line $L_{11}$, which increases the water pressure of the branched water flow 31, a small reverse osmosis membrane apparatus 32 including an RO membrane 32a that yields permeate water 33 with its salts removed from the high-pressure branched water flow 31 and concentrated water 34 with its salts in the branched water flow 31 concentrated. Switching to the branched line $L_{11}$ is performed by a switching valve 51, which can be a three-way-valve, for example.

A small membrane apparatus for chemical fouling monitoring (a small membrane apparatus hereinafter) 30A is an apparatus for performing filtering using a planer membrane of a reverse osmosis membrane and the like. Filtering conditions are more severe than those of the reverse osmosis membrane apparatus 17 of the main setup. Specifically, conditions for filtering pressure, membrane permeation flow rate and concentration are set higher than those for the main setup.

The control of the high-pressure pump P that supplies water to the small membrane apparatus 30A is sufficient to increase filtering pressure and membrane permeation flow rate. In order to increase the concentration, the concentrated water 35 branched from the concentrated water 19 via a concentrated water branched line $L_{12}$ is used. The concentrated water 19 is from the reverse osmosis membrane of the main setup.

By performing a sampling test using the small membrane apparatus 30A, it is possible to detect the chemical fouling before the chemical fouling incident at the reverse osmosis membrane apparatus 17 of the main setup. The chemical fouling can be detected by the measurement of filtering pressure, membrane permeation flow rate, and the salt concentration of the membrane permeate water.

Meanwhile, the gradual clogging at the small membrane apparatus 30 increases the filtering pressure, the membrane permeation flow rate, and the salt concentration of the membrane permeate water as it is operated. Therefore, it is determined as chemical fouling when the rate of the changes as a function of time in these values is exceedingly large (at least not less than 1.1 times as large, preferably not less than 2 times as large) compared with the rate of changes in the values, which has been recorded when the chemical fouling is not present.

Figure 6:
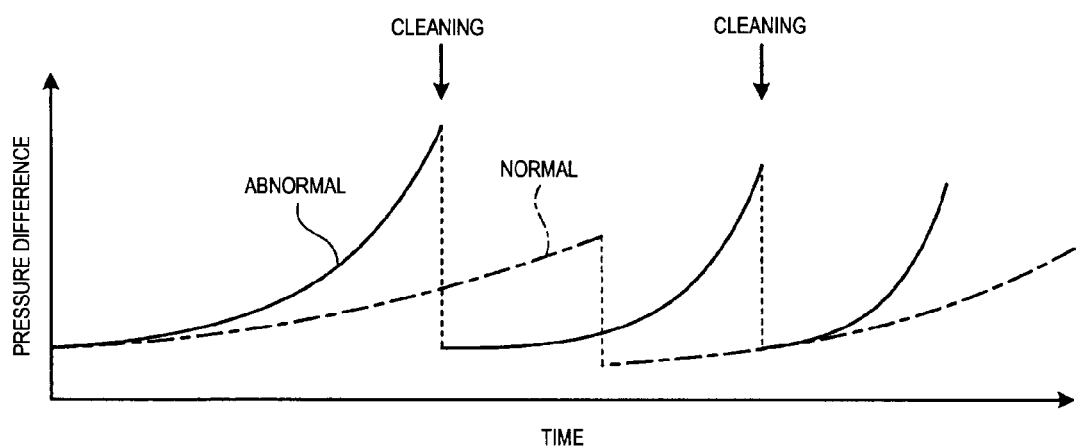
FIG. 6 illustrates the relationship between time passage and pressure variation when the small membrane apparatus is operated at a constant flow rate.

FIG. 6 illustrates a relationship between time passage and pressure variation when the small membrane apparatus is operated at the constant flow rate (permeate flow rate at the RO membrane 32a).

As illustrated in FIG. 6, the changes in the filtering pressure is monitored as a function of time.

When the RO membrane 32a in the small reverse osmosis membrane apparatus 32 is clogged in this setup, the filtering pressure will rise rapidly. It is determined as abnormal when such a rapid increase in the values occurs.

The pressure variation during the normal operation is usually gradual increase as indicated by the dashed line in this figure.

Incidentally, when the pressure reached the prescribed value, regardless of normal or abnormal cases, the cleaning and regeneration are performed.

Thus, using the simple small membrane apparatus 30A illustrated in FIG. 5-1, it is determined as an abnormal behavior when there is an indication that the rate of pressure increase is larger than normal.

Figure 7:
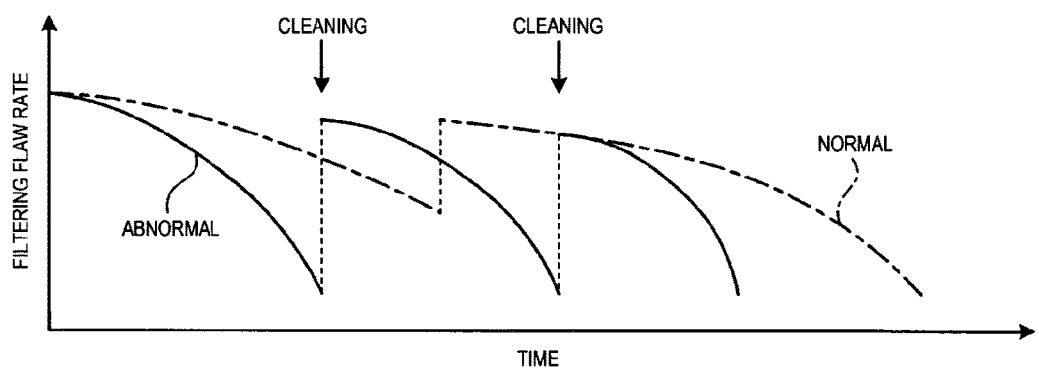
FIG. 7 illustrates the relationship between time passage and flow rate variation when the small membrane apparatus is operated at a constant pressure.

FIG. 7 illustrates the relationship between time passage and flow rate variation when the small membrane apparatus is operated at a constant pressure.

As illustrated in FIG. 7, the changes in the flow rate is monitored as a function of time.

When the RO membrane 32a in the small reverse osmosis membrane apparatus 32 is clogged in this setup, the filtering flow rate will drop rapidly. It is determined as abnormal when such a rapid decrease in the values occurs.

The flow rate variation during the normal operation is usually a gradual decrease as indicated by the dashed line in this figure.

When the flow rate decreased to the prescribed value, the cleaning and regeneration are performed.

Thus, using the simple small membrane apparatus 30A illustrated in FIG. 5-1, it is determined as an abnormal behavior when there is an indication that decrease of filtration flow rate is larger than normal.

Figure 8:
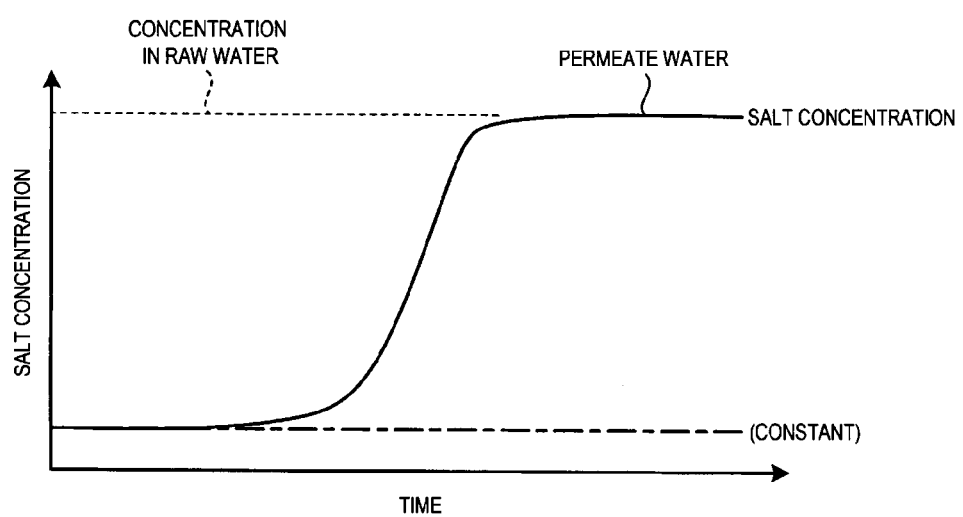
FIG. 8 illustrates the relationship between time passage and salt concentration being monitored at the small membrane apparatus.

FIG. 8 illustrates the relationship between time passage and monitored salt concentration of the membrane permeate water at the small membrane apparatus.

As illustrated in FIG. 8, the salt concentration is monitored as a function of time.

If the RO membrane 32a in the small reverse osmosis membrane apparatus 32 is broken and fails to perform ion separation, the salt concentration will increase as the salt concentration is monitored. It is determined as abnormal when such a rapid increase in the salt concentration occurs.

The salt concentration under the normal condition is fairly constant as indicated by the dashed line.

When the membrane is broken, the RO membrane 32a will be replaced.

Thus, using the simple small membrane apparatus 30 illustrated in FIG. 5-1, it is determined as an abnormal behavior when there is an indication that the salt concentration increases rapidly compared with the normal value.

The cross-flow type apparatus is employed for the simple small membrane apparatus 30A, but the dead-end type may be used as a disposable unit.

In FIG. 5-2, three small reverse osmosis membrane apparatuses are employed.

As illustrated in FIG. 5-2, the small membrane apparatus for chemical fouling monitoring 30B may include multiple (three in the present embodiment) small reverse osmosis membrane apparatuses 32A to 32C on the branched line $L_{11}$, and perform sampling tests on each by operating the valves $V_1$ to $V_3$.

In FIG. 5-2, using the three small reverse osmosis membrane apparatus 32A to 32C, the permeate water 33a to 33c from each of which the salts are removed, and the concentrated water 34a to 34c in which the salt in the branched water flow 31 is concentrated, are obtained.

By opening the valves $V_1$ to $V_3$, the test is performed and it may be used for cleaning of the RO membranes 32a to 32c, or alternating accelerated test.

When 2 or more membrane apparatuses are employed as in this example, it is possible to compare data with the previous one.

Also, it is possible to use difference in rate change, for example, from the previous data as a criteria.

Embodiment 2

Figure 9:
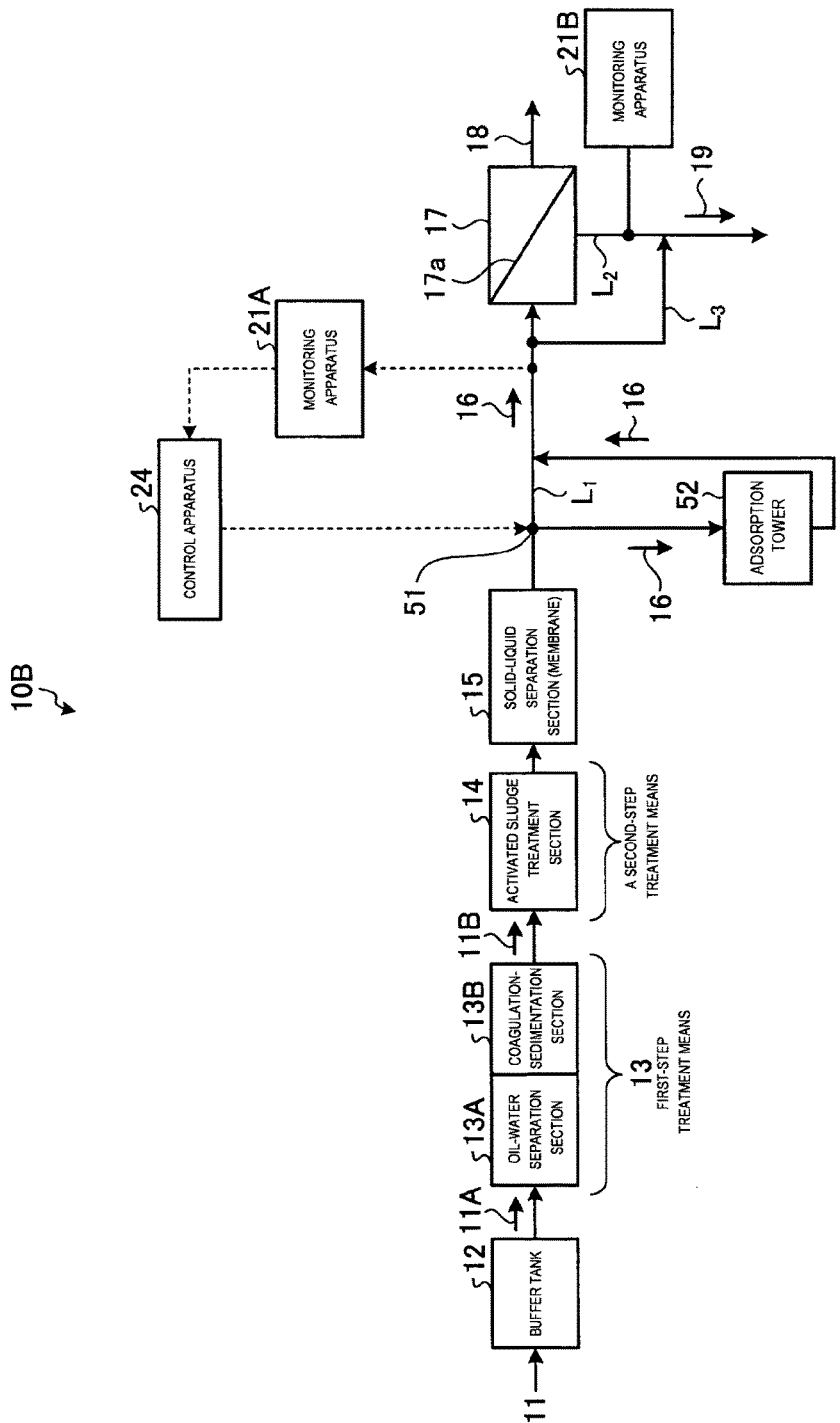
FIG. 9 illustrates a schematic view of the chemical fouling prevention system according to embodiment 2.

FIG. 9 illustrates a schematic view of the chemical fouling prevention system according to embodiment 2.

As illustrated in FIG. 9, in the chemical fouling preventing system 10B according to the present embodiment, the chemical supply section 22 is removed from the chemical fouling preventing system 10A of the embodiment 1, and an adsorption tower 52 is implemented. Since the other arrangements are the same as those in the chemical fouling preventing system 10A of the embodiment 1, the redundant members are given the same number and the redundant description will be omitted.

As illustrated in FIG. 9, the chemical fouling preventing system 10B according to the present embodiment comprises the following: a buffer tank 12 which temporally accepts and stores industrial park waste water 11; a first-step treatment means 13 which treats outflow water 11A from the buffer tank 12 as a first step; an activated sludge treatment section 14 in which outflow water 11B that is already treated by the first-step treatment means 13 is treated by microorganisms as a second-step treatment means; a reverse osmosis membrane apparatus 17 including an RO membrane 17a, which yields recycled water (permeate water) 18 with its salts removed, and concentrated water 19 with salts in industrial park waste water 11 concentrated, from pre-treated inflow water 16; the monitoring apparatuses 21A and 21B, which are disposed at an inflow water line $L_1$ through which the inflow water 16 flows into the reverse osmosis membrane apparatus 17 and/or a concentrated water line $L_2$ through which the concentrated water 19 flows out from the reverse osmosis membrane apparatus 17 and monitor the presence of chemical fouling causal substance in the inflow water 16 or the concentrated water 19; and an adsorption tower 52, into which all of the inflow water 16 is introduced and adsorbs the chemical fouling causal substance, through the operation of a switching valve 51 disposed at the inflow water line $L_1$ of the reverse osmosis membrane apparatus 17, upon the presence of chemical fouling causal substances in the inflow water 16 or the concentrated water 19 being confirmed as a result of the monitoring by the monitoring apparatuses 21A and 21B. Thus, the chemical fouling preventing system 10A-1 performs countermeasures to remove chemical fouling causal substance from inflow water 16 before it enters the reverse osmosis membrane apparatus 17.

Exemplary adsorbents for removing chemical fouling causal substances in the adsorption tower 52 include activated charcoal, reverse osmosis membrane materials (for example, polyamide resin) and the like.

Since all of the inflow water 16 is introduced into the adsorption tower 52 and chemical fouling causal substances are removed, the inflow water 16 returned from the adsorption tower 52 into the inflow water line $L_1$ is purified. Thus, the contaminant can be identified before its introduction into the reverse osmosis membrane apparatus 17 and countermeasures can be implemented.

Embodiment 3

Figure 10:
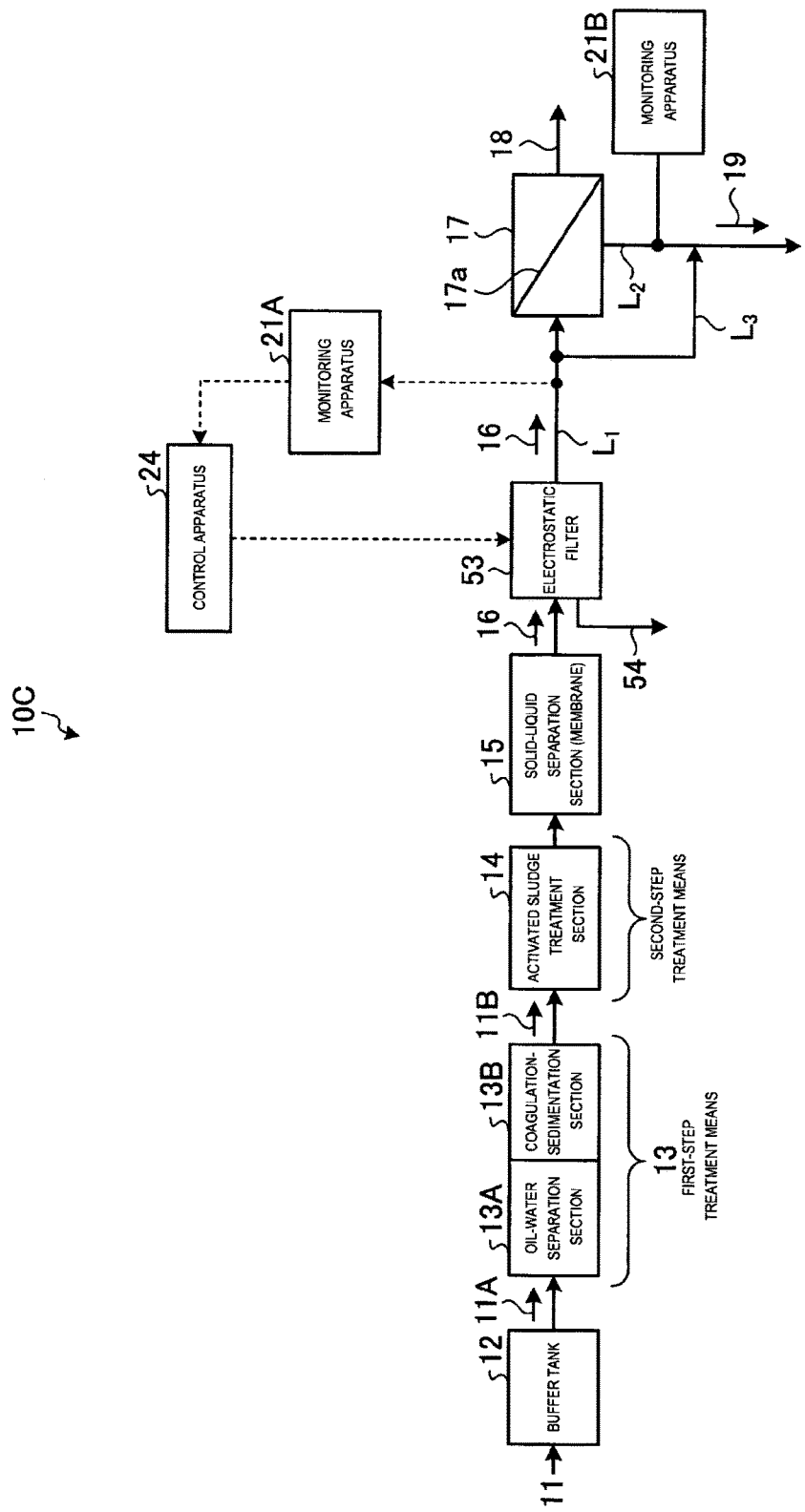
FIG. 10 illustrates a schematic view of the chemical fouling prevention system according to embodiment 3.

FIG. 10 is a schematic view of the chemical fouling prevention system according to embodiment 3.

As illustrated in FIG. 10, in the chemical fouling preventing system 10C according to the present embodiment, the chemical supply section 22 is removed from the chemical fouling preventing system 10A of the embodiment 1, and an electrostatic filter 53 is implemented. Since the other arrangements are the same as those in the chemical fouling preventing system of the embodiment 1, the redundant members are given the same number and the redundant description will be omitted.

As illustrated in FIG. 10, a chemical fouling preventing system 10C according to the present embodiment comprises the following: a buffer tank 12, which temporally accepts and stores industrial park waste water 11; a first-step treatment means 13 which treats outflow water 11A from the buffer tank 12 as a first step; an activated sludge treatment section 14 in which outflow water 11B that is already treated by the first-step treatment means 13 is treated by microorganisms as a second-step treatment means; a reverse osmosis membrane apparatus 17 including an RO membrane 17a, which yields recycled water (permeate water) 18 with its salts removed, and concentrated water 19 with salts in industrial park waste water 11 concentrated, from pretreated inflow water 16; monitoring apparatuses 21A and 21B, which are disposed at an inflow water line $L_1$ through which the inflow water 16 flows into the reverse osmosis membrane apparatus 17 and/or a concentrated water line $L_2$ through which the concentrated water flows out from the reverse osmosis membrane apparatus 17 and monitor the presence of chemical fouling causal substance in the inflow water 16 or the concentrated water 19; and an electrostatic filter, which is a means to remove chemical fouling causal substance in the inflow water 16 of the reverse osmosis membrane apparatus 17 electrostatically. Thus, upon the presence of chemical fouling causal substances in the inflow water 16 or the concentrated water 19 being confirmed as a result of the monitoring by the monitoring apparatuses 21A and 21B, the electrostatic treatment is performed against the inflow water 16 that is inflowing into the reverse osmosis membrane apparatus 17 by operating the electrostatic filter 53, and countermeasure is performed to remove chemical fouling causal substance from inflow water 16 before it enters the reverse osmosis membrane apparatus 17.

The electrostatic filter 53 can prevent chemical fouling causal substances such as cationic surfactants and the like from passing through while allowing only the dielectric inflow water 16 to go through the filter by applying a high voltage to a metal filter.

In the electrostatic filter 53, chemical fouling causal substances such as cationic surfactants, for example, can be repelled by the positively charged filter and is prevented from permeating through the electrostatic filter 53.

Removal of the cationic surfactant can be performed by adsorption of the cationic surfactant by a negatively-charged structure (e.g. electrode) opposed to the charge of the electrostatic filter 53. The cationic surfactant adsorbed to the electrode can be removed from the electrode by inverting the electrical potential between the electrostatic filter 53 and the electrode, hence charging the electrostatic filter negatively and the electrode positively. The water with removed contaminant is drained from the drain pipe 54 disposed on the upstream side of the electrostatic filter 53 to the outside system.

Though the method of electrostatic removal using the electrostatic filter 53 as an electrostatic removal means is described in the present embodiment, the present invention is not limited thereto and capacitive deionization (CDI) can be used, for example.

Embodiment 4

Figure 11:
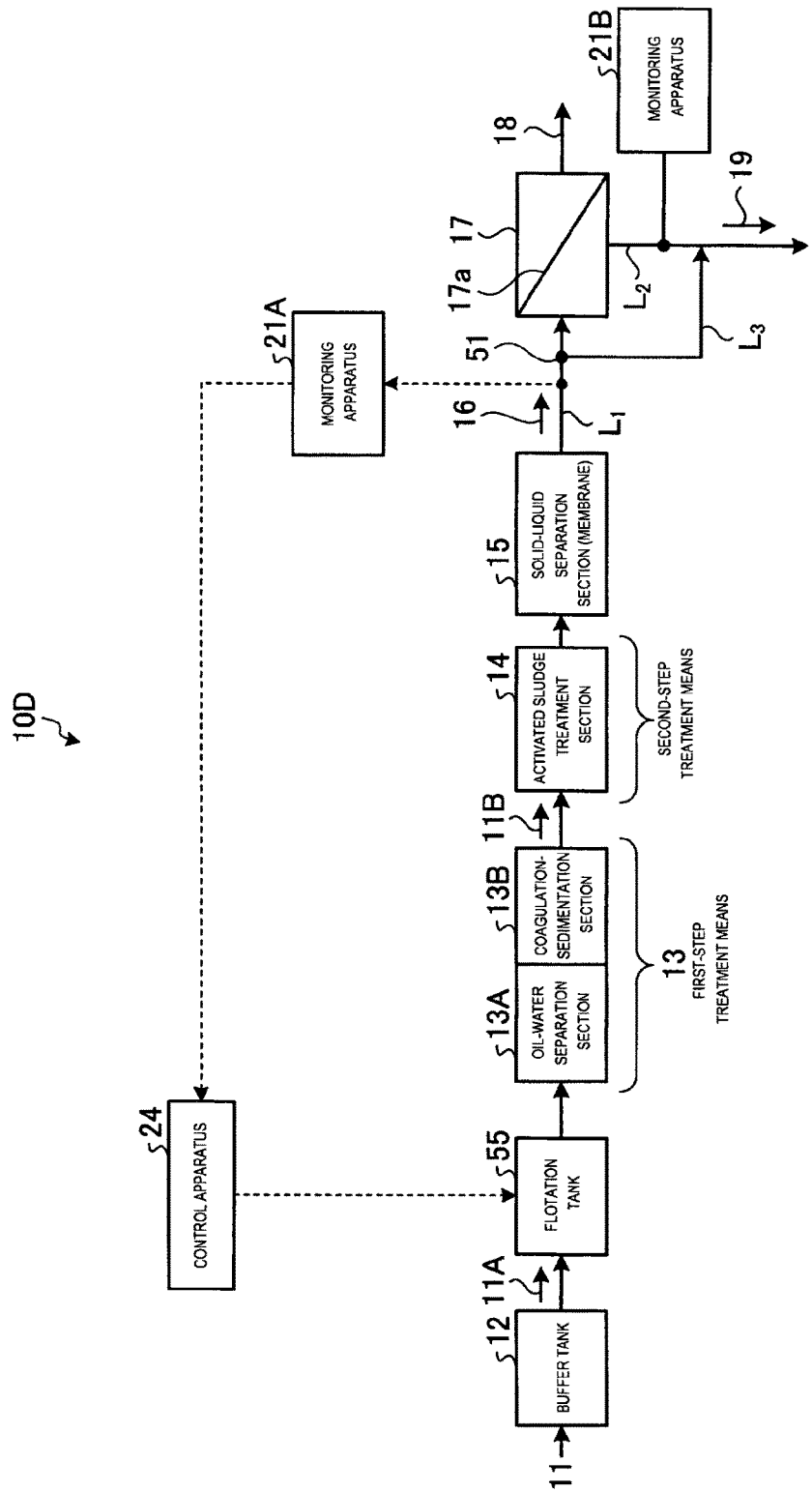
FIG. 11 illustrates a schematic view of the chemical fouling prevention system according to embodiment 4.

FIG. 11 is a schematic view of the chemical fouling prevention system according to embodiment 4.

As illustrated in FIG. 11, in the chemical fouling preventing system 10D according to the present embodiment, the chemical supply section 22 is removed from the chemical fouling preventing system 10A of the embodiment 1, and a flotation tank 55 is implemented on the front stage side of the oil-water separation section 13A.

The flotation tank 55 having a means to produce bubbles or a means to produce pressurized gas is disposed on the front stream side of the oil-water separation section 13A of the first-step treatment means 13 and let the chemical fouling causal substance float and remove by the bubble or pressurized gas generation.

Meanwhile, the position of the flotation tank 55 is not limited to the front stream side of the oil-water separation section 13A and can be disposed on the back stream side of the oil-water separation section.

Thus, upon the presence of chemical fouling causal substances in the inflow water 16 or the concentrated water 19 being confirmed as a result of the monitoring by the monitoring apparatuses 21A and 21B, the chemical fouling causal substance is floated and removed by the bubbles or gases generated vigorously at the flotation tank 55 on the front stream side where it enters the reverse osmosis membrane apparatus 17.

Embodiment 5

Figure 12:
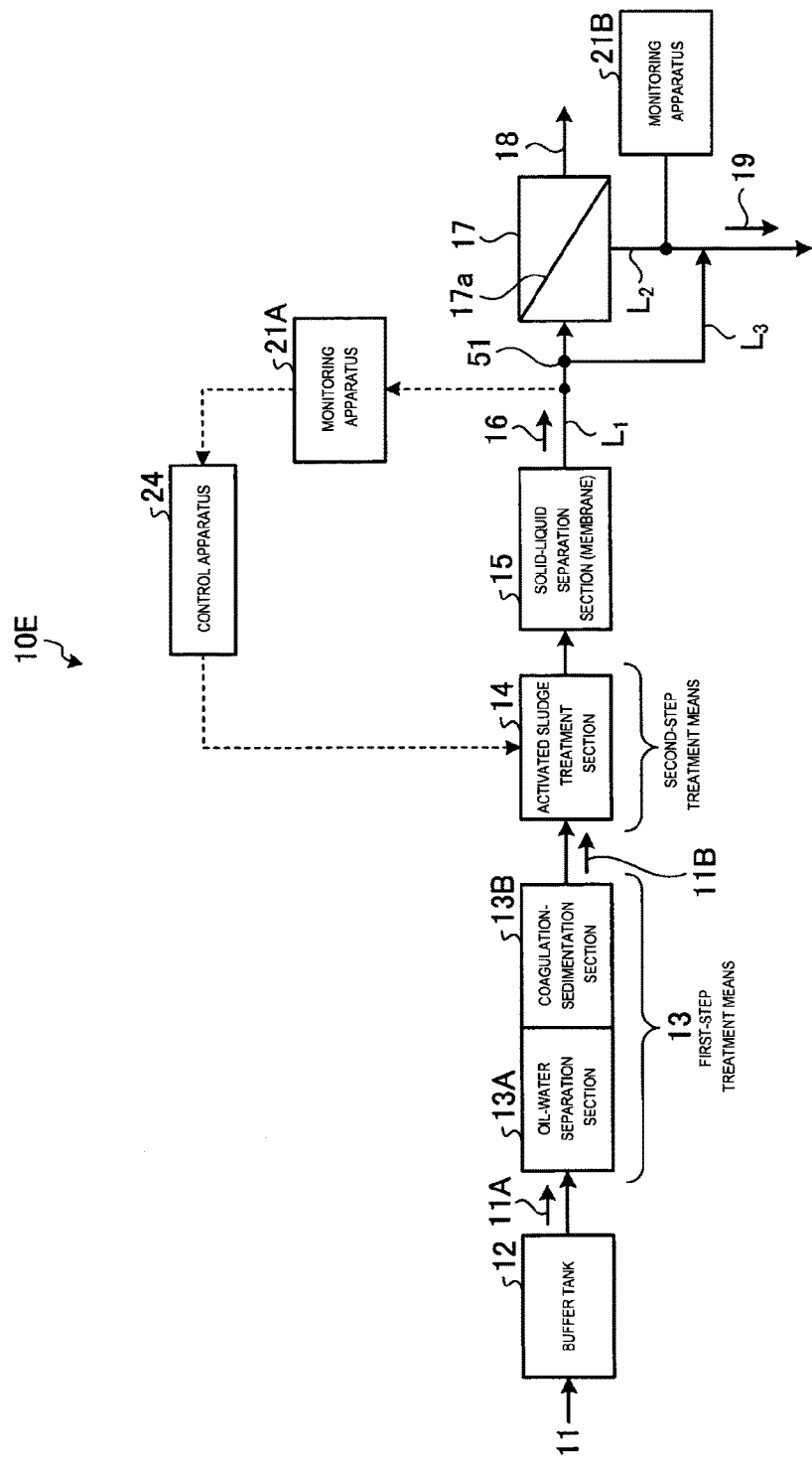
FIG. 12 illustrates a schematic view of the chemical fouling prevention system according to embodiment 5.

FIG. 12 is a schematic view of the chemical fouling prevention system according to embodiment 5.

As illustrated in FIG. 12, in the chemical fouling preventing system 10E according to the present embodiment, the chemical supply section 22 is removed from the chemical fouling preventing system 10A of the embodiment 1.

Thus, as monitored by the monitoring apparatus 21A, more rigorous operation is performed than normal is performed at the activated sludge treatment section 14.

For example, by activating the activated sludge (e.g. injecting more air, introducing oxygen) at the activated sludge treatment section 14, the chemical fouling causal substance is adsorbed or decomposed oxidatively and removed.

Embodiment 6

Figure 13:
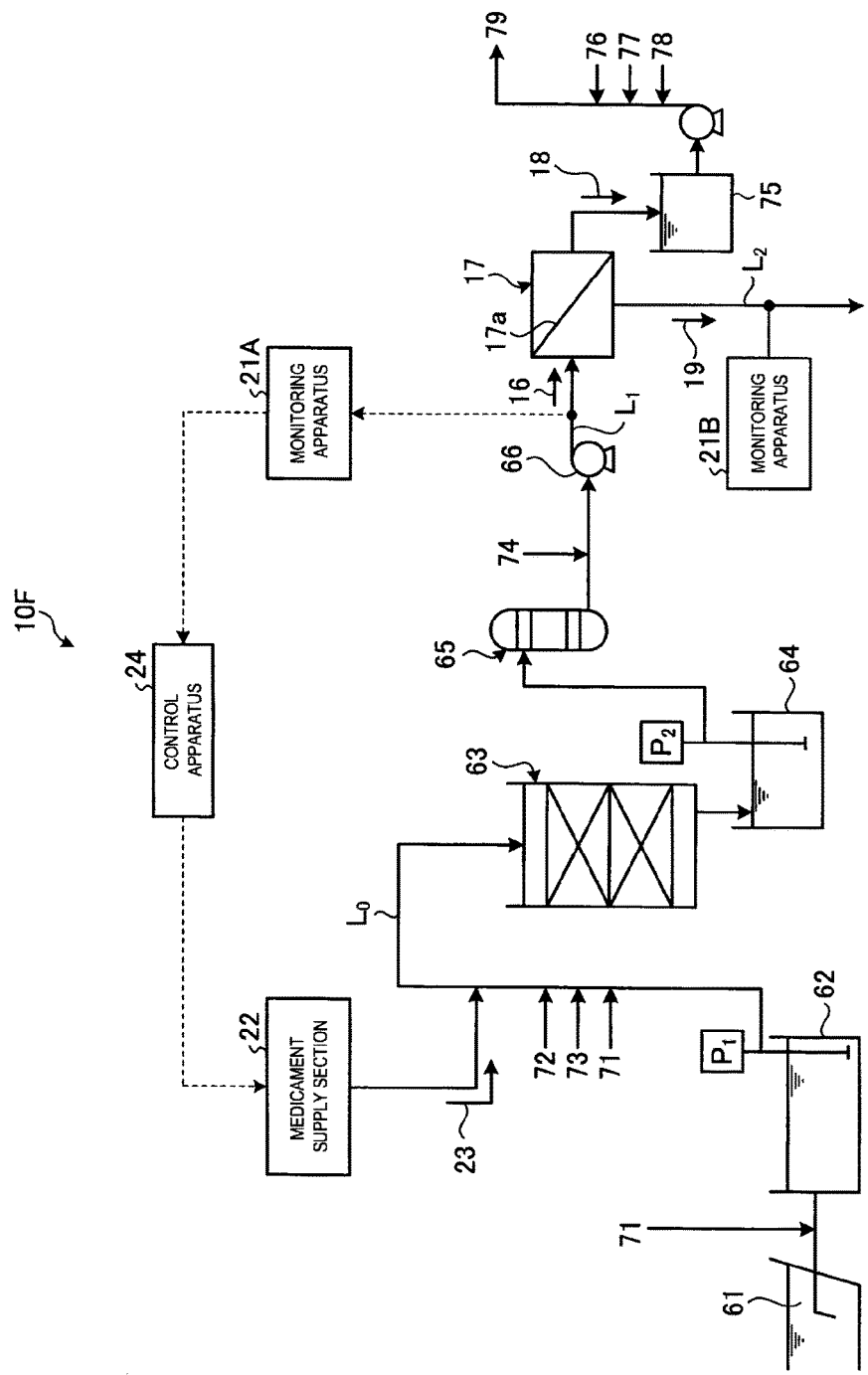
FIG. 13 illustrates a schematic view of the chemical fouling prevention system according to embodiment 6.
Figure 14:
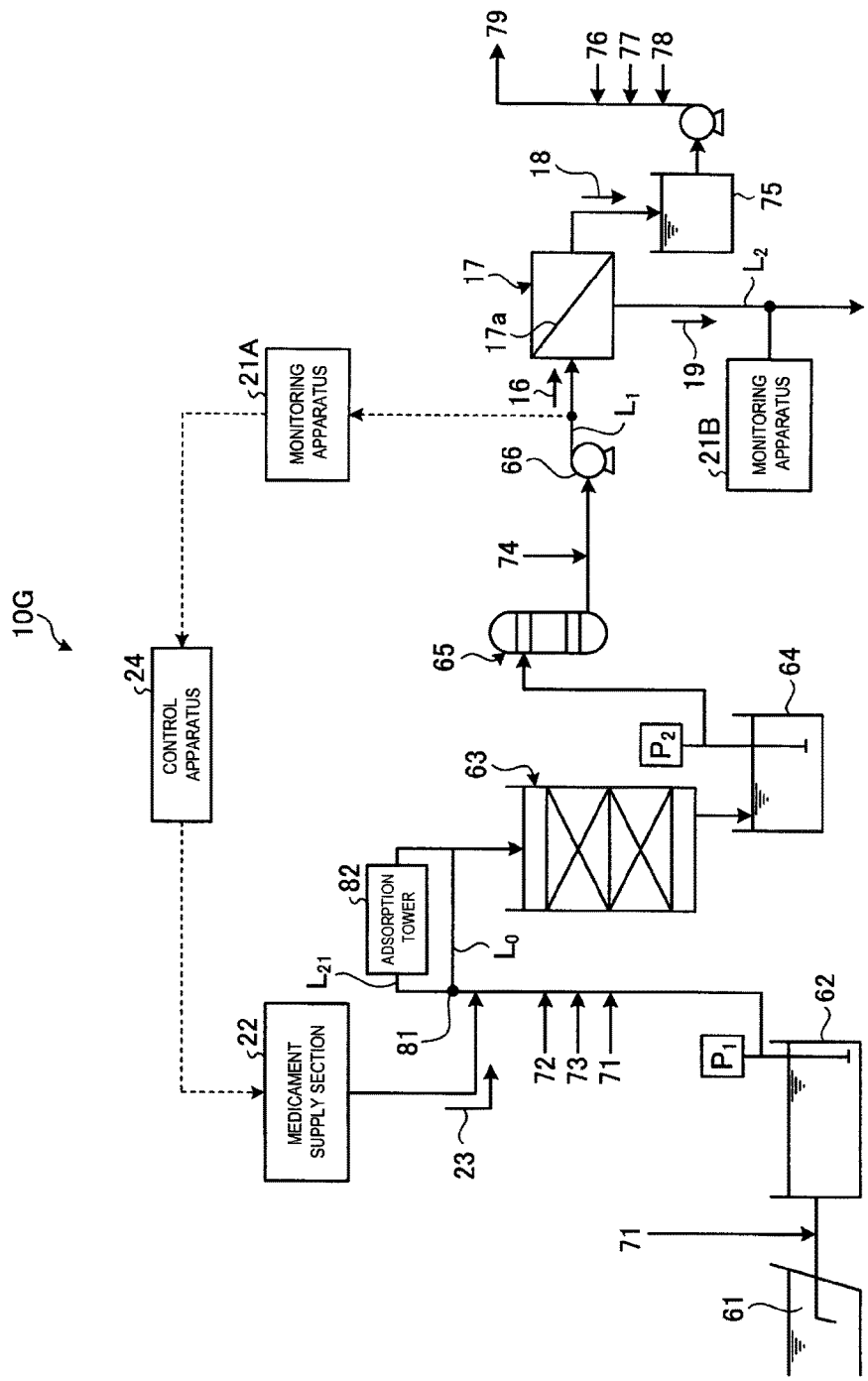
FIG. 14 illustrates a schematic view of another chemical fouling prevention system according to embodiment 6.

FIG. 13 is a schematic view of the chemical fouling prevention system according to embodiment 6. FIG. 14 is a schematic view of another chemical fouling prevention system according to embodiment 6.

Sea water is used as raw water in this embodiment. Since the other arrangements are the same as those in the chemical fouling preventing system of the embodiment 1, the redundant members are given the same number and the redundant description will be omitted.

As illustrated in FIG. 13, the chemical fouling preventing system 10F according to the present embodiment comprises the following: a storage section 62 that receives and stores sea water 61 temporally; a filtering device 63 that filters out impurities from the sea water 61, which is drawn from the storage section 62 by the pump $P_1$, then introduced through the sea water line $L_0$; a filtered water tank 64 that stores the filtered sea water 61 temporally; a safety filter 65 that removes suspensions in the sea water 61, which is drawn from the filtered water tank 64 by the filtered water pump $P_2$; a high-pressure pump 66 that pressurizes the sea water 61 after filtering; monitoring apparatuses 21A and 21B, which are disposed at an inflow water line $L_1$ through which the pressurized inflow water 16 flows into the reverse osmosis membrane apparatus 17 and/or a concentrated water line $L_2$ through which the concentrated water 19 flows out from the reverse osmosis membrane apparatus 17 and monitor the presence of chemical fouling causal substance in the inflow water 16 or the concentrated water 19; and a chemical supply section 22, which is a removal apparatus that removes the chemical fouling causal substances from the inflow water 16 on the front stream side of the inflow into the reverse osmosis membrane apparatus 17, upon the presence of chemical fouling causal substances in the inflow water 16 or the concentrated water 19 being confirmed as a result of the monitoring by the monitoring apparatuses 21A and 21B. Thus, countermeasures are performed to remove chemical fouling causal substance from inflow water 16 before it enters the reverse osmosis membrane apparatus 17.

In the present embodiment, as for the filtering device 63, sands as a filter material and a Dual Media Filter (DMF), in which anthracite is placed in layers, are used in the filtering tank, but the present invention is not limited to this example.

Disinfectant 71 is supplied to the sea water 61 introduced into the storage section 62 that stores the sea water 61, and flocculant 72, acid 73 and disinfectant 71, for example, are also each supplied to the sea water 61 that is received by the filtering device 63. Additionally, reductant 74 is supplied to the sea water 61, which is supplied to the high-pressure pump 66 and the recycled water 18 is recycled from the sea water 61.

The recycled water 18 that is treated by the reverse osmosis membrane apparatus 17 is temporally stored in a recycle tank 75. When necessary, disinfectant 76, mineral agent 77, and alkaline agent 78 are supplied to produce potable water 79.

By employing the chemical fouling preventing system 10F like this, the following procedures are performed depending on the presence of the chemical fouling causal substance.

1. If the absence of the cationic surfactant, which is a chemical fouling causal substance, is confirmed as a result of the measurement of the cationic surfactant by the monitoring apparatus 21A or 21B, then the normal production operation of recycled water 18 is continued.

2. As opposed to 1, if the presence of the cationic surfactant, which is a chemical fouling causal substance, is confirmed as a result of the measurement of the cationic surfactant by the monitoring apparatus 21A or 21B, then the operation to inject anionic chemical 23 from the chemical supply section 22 into the sea water 61 supplied to the filtering device 63 by the control of the control apparatus 24 is performed.

When desalination treatment of the sea water is performed, it is possible to prevent inflow of contaminant into the reverse osmosis membrane apparatus 17 and protect the reverse osmosis membrane apparatus 17 by monitoring chemical fouling causal substance by monitoring apparatuses 21A and 21B and by performing the operation to inject the chemical 23, which reduces the cause of the chemical fouling, using the control apparatus 24.

Also, as illustrated in FIG. 14, in the chemical fouling preventing system 10G, the adsorption tower 82 which is disposed in the bypass line $L_{21}$ branched from the sea water line $L_0$ to the filtering device 63, adsorbs and treats the chemical fouling causal substance. Exemplary adsorbents to remove chemical fouling causal substance in the adsorption tower 82 are activated charcoal or reverse osmosis membrane material (e.g. polyamide resin) and the like.

Since the chemical fouling causal substance is removed by switching the switching valve 81 disposed in the sea water line $L_0$ and introducing all the sea water 61 via the bypass line $L_{21}$ to the adsorption tower 52, the sea water 61 returned to the sea water line $L_0$ from the adsorption tower 52 is cleaned. Thus, the contaminant can be identified before its introduction into the reverse osmosis membrane apparatus 17 and the countermeasure can be implemented.

| Description of Symbols | |
|---|---|
| 10 | Chemical fouling preventing system |
| 11 | Industrial park waste water |
| 12 | Buffer tank |
| 13 | First-step treatment means |
| 14 | Activated sludge treatment apparatus |
| 16 | Inflow water |
| 17 | Reverse osmosis membrane apparatus |
| 18 | Recycled water (permeate water) |
| 19 | Concentrated water |
| 21A, 21B | Monitoring apparatus |
| 22 | Chemical supply section |
| 23 | Chemical |

The invention claimed is:

1. A system to prevent chemical fouling on a reverse osmosis membrane, the system comprising:
   a pre-treatment unit that pre-treats raw water to yield inflow water;
   a reverse osmosis membrane apparatus that is provided downstream of the pre-treatment unit, including a reverse osmosis membrane that yields recycled water and concentrated water from the inflow water, salts being removed in the recycled water and salts in raw water being concentrated in the concentrated water;
   an inflow water line that is connected between the pre-treatment unit and the reverse osmosis membrane apparatus and through which the inflow water flows into the reverse osmosis from the pre-treatment unit;
   a concentrated water line that is connected from the reverse osmosis membrane apparatus and through which the concentrated water flows out;
   a monitoring apparatus, disposed at both or either of the inflow water line or the concentrated water line, which monitors the presence of chemical fouling causal substances in the inflow water or the concentrated water; and
   a removal apparatus that is connected to the pre-treatment unit and supplies a chemical to the pre-treatment unit to removes the chemical fouling causal substances from the inflow water on a front upstream side of the inflow thereof into the reverse osmosis membrane apparatus, upon the presence of chemical fouling causal substances in the inflow water or the concentrated water being confirmed as a result of the monitoring by the monitoring apparatus, wherein
   the pre-treatment comprises a first-step treatment unit including an oil-water separation section and a coagulation-sedimentation section, a second-step treatment unit including an activated sludge treatment section, and a solid-liquid separation section, and
   the removal apparatus is connected to the coagulation-sedimentation section, the activated sludge treatment unit, or a position therebetween to supply the chemical thereto.

2. The system to prevent chemical fouling on a reverse osmosis membrane according to claim 1, wherein
   the monitoring apparatus performs chemical monitoring to determine the chemical fouling causal substance.

3. The system to prevent chemical fouling on a reverse osmosis membrane according to claim 1, wherein
   the monitoring apparatus branches off a part of the inflow water and confirms the presence of the chemical fouling causal substances therein by a small membrane apparatus for chemical fouling monitoring.

* * * * *